United States Patent [19]
Young

[11] Patent Number: 5,697,566
[45] Date of Patent: Dec. 16, 1997

[54] CLOSED FACED SPINNING REEL WITH MULTIPLE FUNCTION TRIGGER

[75] Inventor: John Newton Young, Fairfax, Calif.

[73] Assignee: Charles C. Worth Corporation, San Rafael, Calif.

[21] Appl. No.: 614,642

[22] Filed: Mar. 13, 1996

[51] Int. Cl.$^6$ ............................................. A01K 89/01
[52] U.S. Cl. ........................... 242/239; 242/243; 242/291
[58] Field of Search ................................ 242/243, 244, 242/238, 239, 291

[56] References Cited

U.S. PATENT DOCUMENTS

| | | | |
|---|---|---|---|
| 3,036,789 | 5/1962 | Mauborgne | 242/238 |
| 3,044,730 | 7/1962 | Yeada | 242/238 X |
| 3,088,691 | 5/1963 | Hull | 242/244 |
| 3,858,822 | 1/1975 | Wood | 242/239 |
| 4,470,554 | 9/1984 | Kobayashi et al | 242/243 X |
| 4,529,142 | 7/1985 | Yoshikawa | 242/243 |
| 4,634,073 | 1/1987 | Coquelet | 242/291 X |
| 4,645,137 | 2/1987 | Young | 242/291 X |
| 4,676,451 | 6/1987 | Dispas | 242/291 X |
| 4,749,285 | 6/1988 | Noda | 242/244 |
| 4,760,974 | 8/1988 | Steven L. Swisher. | |

FOREIGN PATENT DOCUMENTS 2258595A 2/1993 United Kingdom.

*Primary Examiner*—Daniel P. Stodola
*Assistant Examiner*—Emmanuel M. Marcelo
*Attorney, Agent, or Firm*—Virginia H. Meyer

[57] ABSTRACT

A multi-function-trigger actuated reel for allowing both actuation of the free spool mechanism and adjustment of the drag brake mechanism of a close face spinning reel with a single actuating trigger. The inventive device includes a main body having a reel mechanism mounted thereto. The reel mechanism includes a spool upon which fishing line can be wound, a drag plunger effecting frictional drag on the spool, and a main shaft which can be forwardly biased to cause free-spooling of the reel mechanism. A trigger assembly is mounted relative to the main body and includes a trigger arm which can be pivoted in a plurality of directions to selectively effect movement of the drag plunger and the main shaft through the single trigger arm.

19 Claims, 7 Drawing Sheets

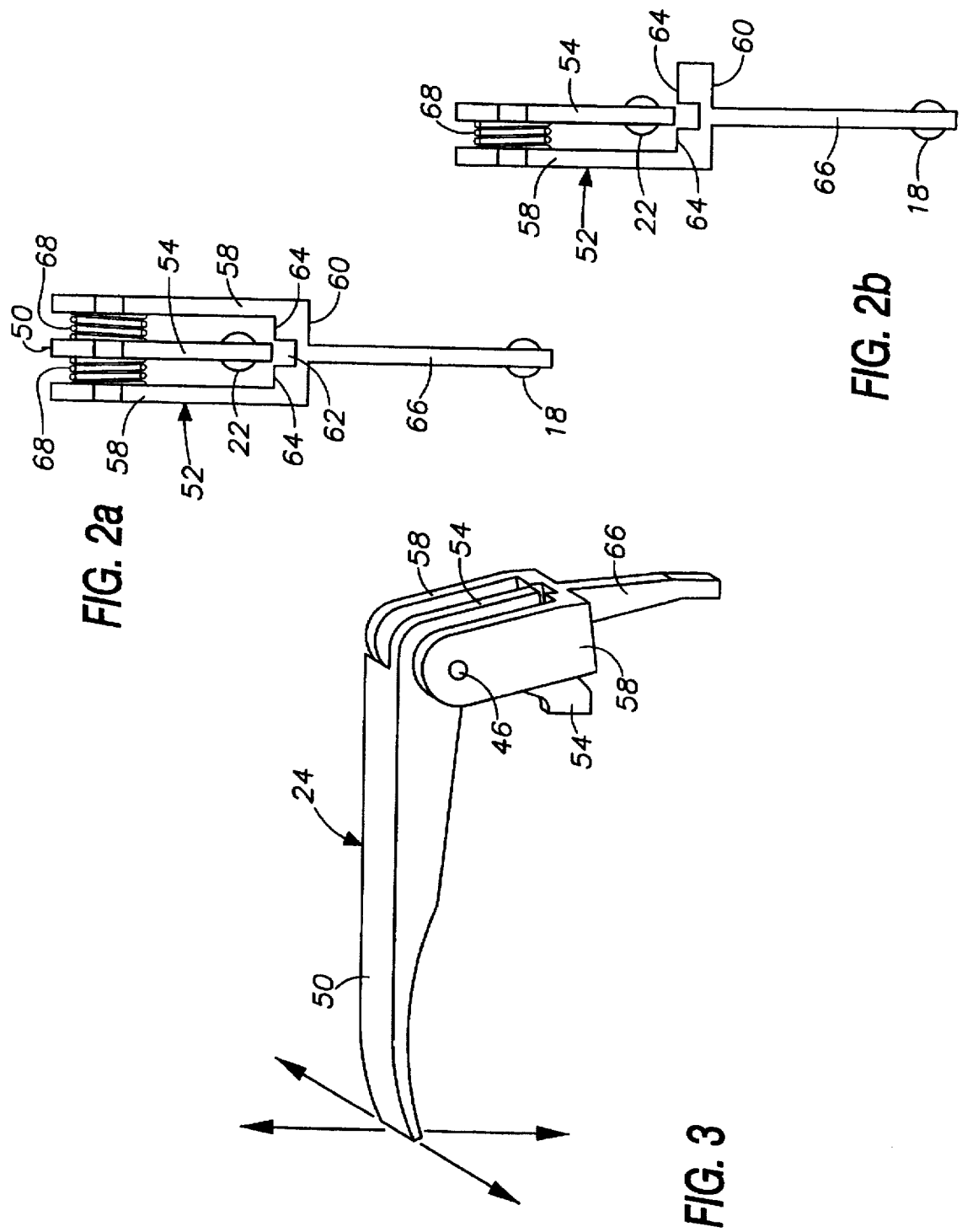

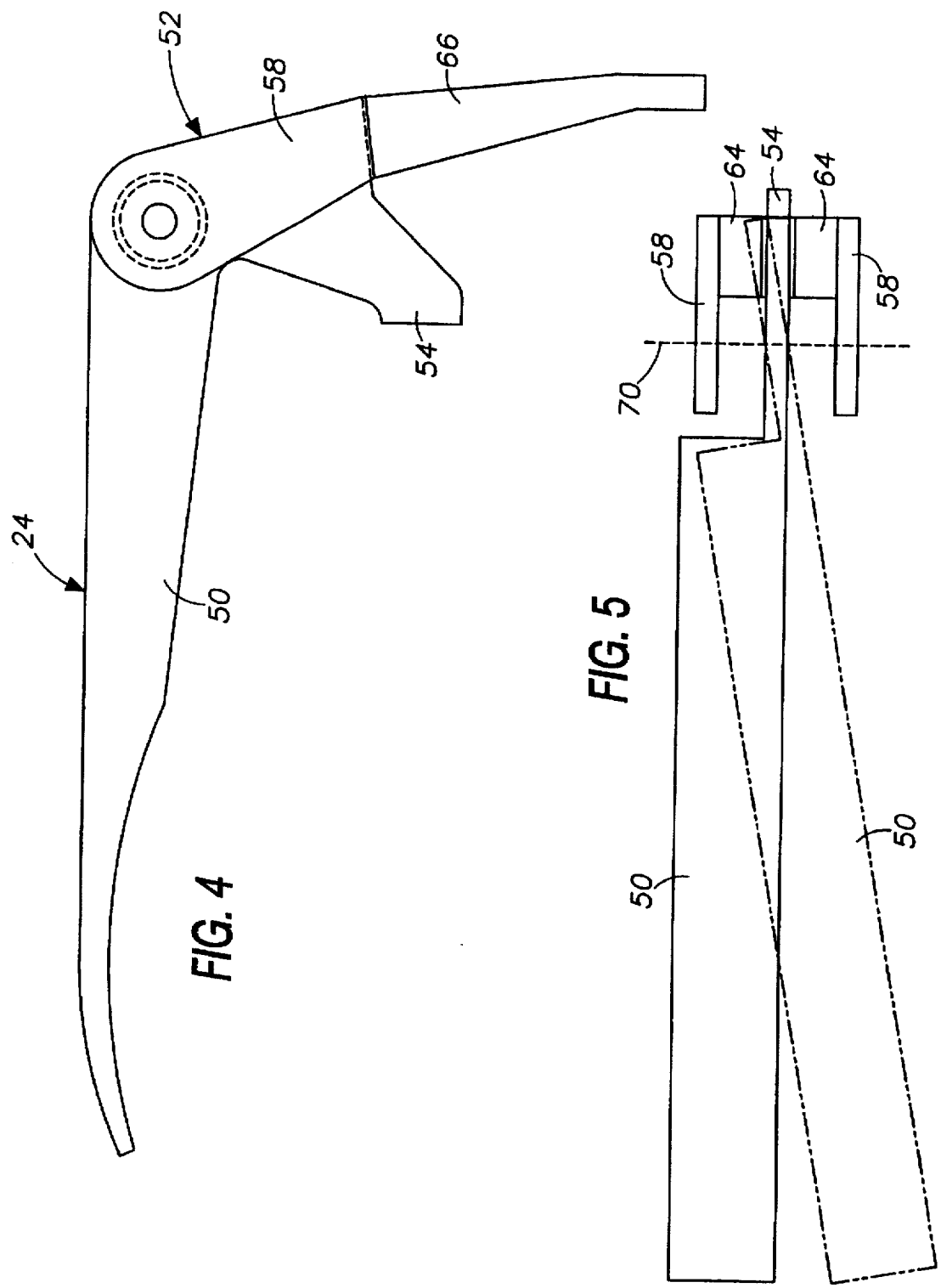

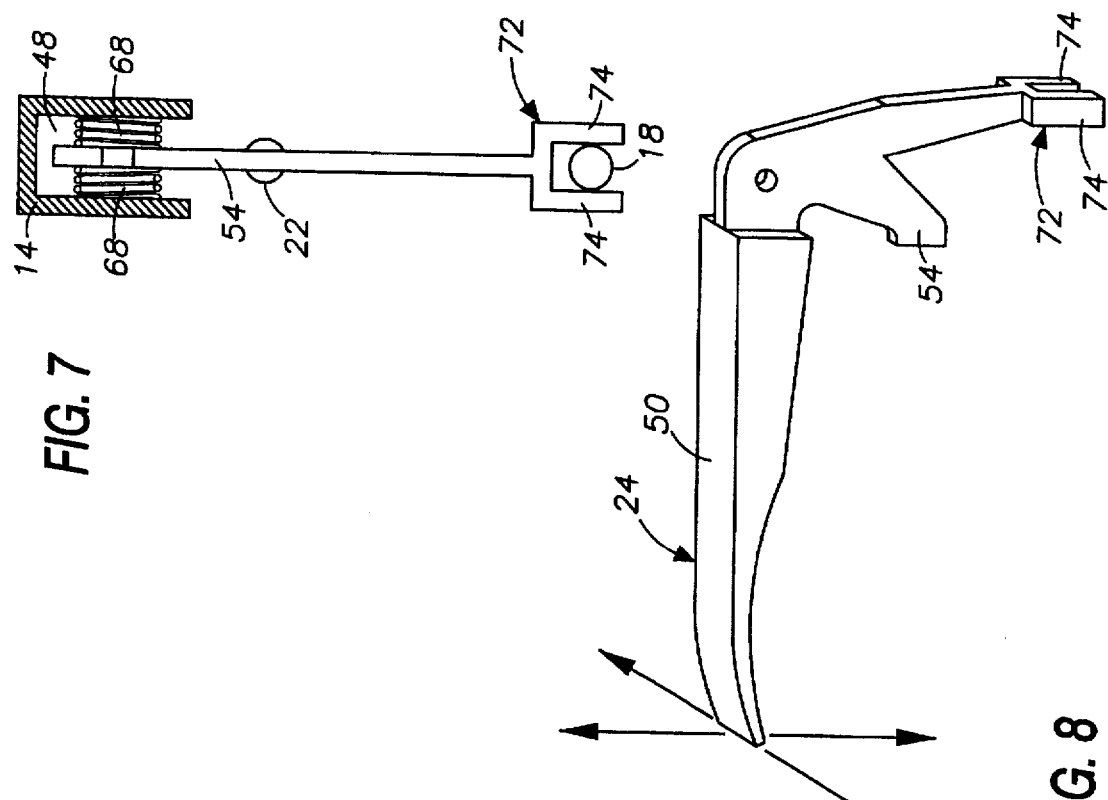
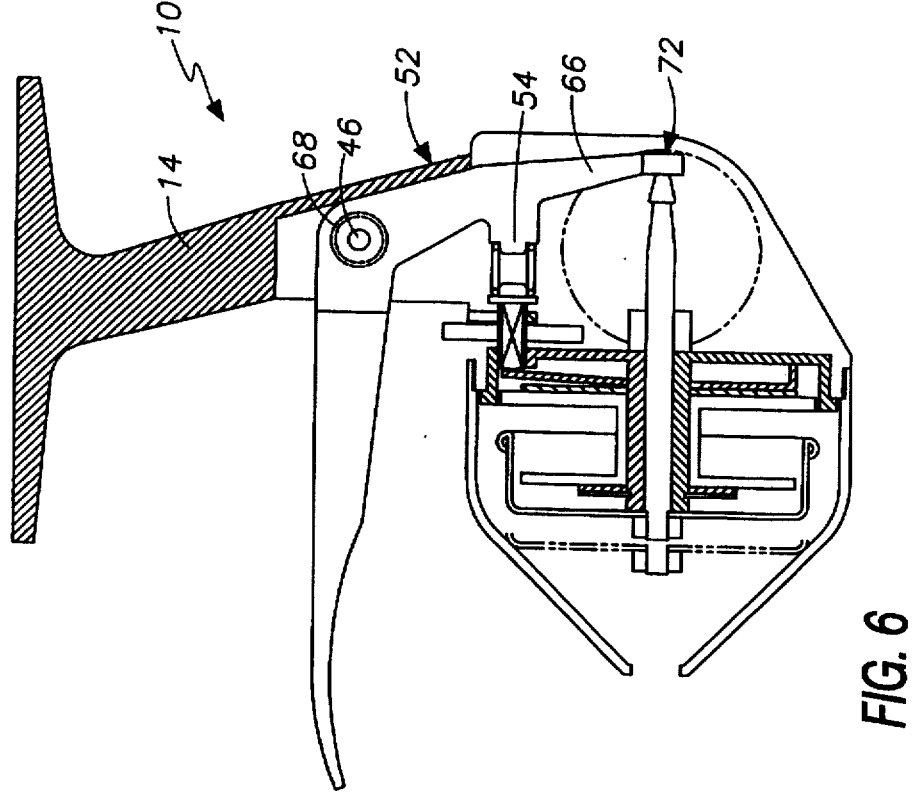

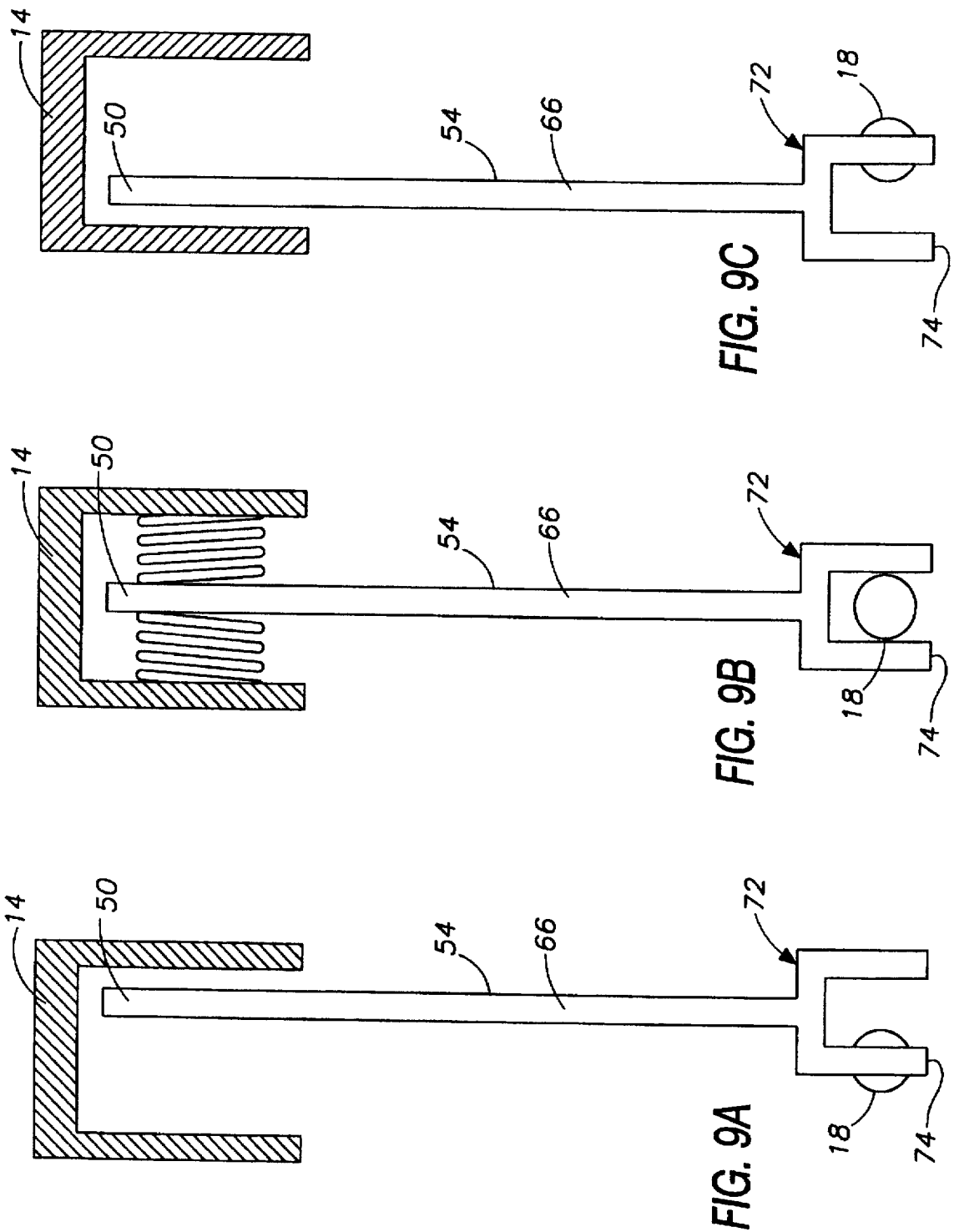

5,697,566

CLOSED FACED SPINNING REEL WITH MULTIPLE FUNCTION TRIGGER

BACKGROUND OF THE INVENTION

1. Field of the Invention

The present invention relates to close face spinning reels and more particularly pertains to a multi-function-trigger actuated reel for allowing both actuation of the free spool mechanism and adjustment of the drag brake mechanism of a close face spinning reel with a single actuating trigger.

2. Description of the Prior Art

The use of fishing reels generally described as close face spinning reels, or CFS reels, is known in the prior art. More specifically, close face spinning reels heretofore devised and utilized are known to include a trigger which actuates a free-spool mechanism to release line for casting. A typical CFS reel has a completely separate drag or braking system for providing resistance to the pull of fish during retrieval of the fishing line. Operating this separate drag system usually requires both hands of the fisherman and it is therefore difficult to make any drag adjustments while fighting a fish.

An example of such a known prior art close face spinning reel can be seen within U.S. Pat. No. 4,749,285 which includes a reel body and a spool rotatably supported to a front portion of the reel body. A drag thumbscrew is provided for setting an initial load of a drag brake member, and a drag lever is provided for adjusting within a predetermined range an initial load set by the thumbscrew. While this patent discloses a lever operated adjusting mechanism for setting the load of the drag brake mechanism, there is no suggestion or teaching in the patent to incorporate such lever action into the free spool mechanism operating lever.

OBJECTS AND SUMMARY OF THE INVENTION

In view of the foregoing disadvantages inherent in the known types of close face spinning reels now present in the prior art, the present invention provides a new multi-function-trigger actuated reel device wherein the same construction can be utilized for allowing both actuation of the free spool mechanism and adjustment of the drag brake mechanism of a close face spinning reel with a single actuating trigger. As such, the general purpose of the present invention, which will be described subsequently in greater detail, is to provide a new multi-function-trigger actuated reel apparatus and method which has many of the advantages of the close face spinning reels mentioned heretofore and many novel features that result in a multi-function-trigger actuated reel which is not anticipated, rendered obvious, suggested, or even implied by any of the prior art close face spinning reels, either alone or in any combination thereof.

It is therefore an object of the present invention to provide a new multi-function-trigger actuated reel apparatus which includes a single trigger serving both to operate a free spool mechanism and to effect adjustment of a drag mechanism.

It is another object of the present invention to provide a new multi-function-trigger actuated reel in which the drag mechanism is capable of being adjustably preset to a predetermined initial setting.

It is another object of the present invention to provide a new multi-function-trigger actuated reel in which the trigger operates so as to be easily manipulated by either a right or a left handed fishermen.

It is another object of the present invention to provide a new multi-function-trigger actuated reel in which the trigger additionally controls a baitfeeder function allowing for the ability to quickly apply strong drag while in a free spool condition without having to first re-engage the crank retrieval mechanism of the reel.

It is another object of the present invention to provide a new multi-function-trigger actuated reel in which accidental actuation Of the free spool mechanism is substantially reduced or eliminated during use of the trigger to manipulate drag tension.

It is another object of the present invention to provide a new multi-function-trigger actuated reel which may be easily and efficiently manufactured and marketed.

It is another object of the present invention to provide a new multi-function-trigger actuated reel which is of a durable and reliable construction.

It is another object of the present invention to provide a new* multi-function-trigger actuated reel which is susceptible of a low cost of manufacture with regard to both materials and labor, and which accordingly is then susceptible of low prices of sale to the consuming public, thereby making such multi-function-trigger actuated reels economically available to the buying public.

It is yet another object of the present invention to provide a new multi-function-trigger actuated reel which provides in the apparatuses and methods of the prior art some of the advantages thereof, while simultaneously overcoming some of the disadvantages normally associated therewith.

To attain these and other objects, the present invention generally comprises a multi-function-trigger actuated reel for allowing both actuation of the free spool mechanism and adjustment of the drag brake mechanism of a close face spinning reel with a single actuating trigger. The inventive device includes a main body having a reel mechanism mounted therein. The reel mechanism includes a spool upon which fishing line can be wound, a drag plunger effecting frictional drag on the spool, and a main shaft which can be forwardly biased to cause free-spooling of the reel mechanism. A trigger assembly is mounted relative to the main body and includes a trigger arm which can be pivoted in a plurality of directions to selectively effect movement of the drag plunger and/or the main shaft through the single trigger arm.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2a is an end elevational view of a selective engaging means of the present invention.

FIG. 2b is an end elevational view of a simplified form of the selective engaging means.

FIG. 3 is an isometric illustration of a trigger assembly of FIG. 2a.

FIG. 4 is a side elevational view of the trigger assembly.

FIG. 5 is a top plan view of the trigger assembly.

FIG. 6 is a cross sectional view of the invention including an alternative form of the selective engaging means.

FIG. 7 is an end elevational view of the alternative form of the selective engaging means of the present invention.

FIG. 8 is an isometric illustration of the alternative form of the selective engaging means.

FIG. 9 (a,b,c) is an end elevational view of the alternative form of the selective engaging means detailing operation thereof.

DESCRIPTION OF PREFERRED EMBODIMENT

Figure 1:
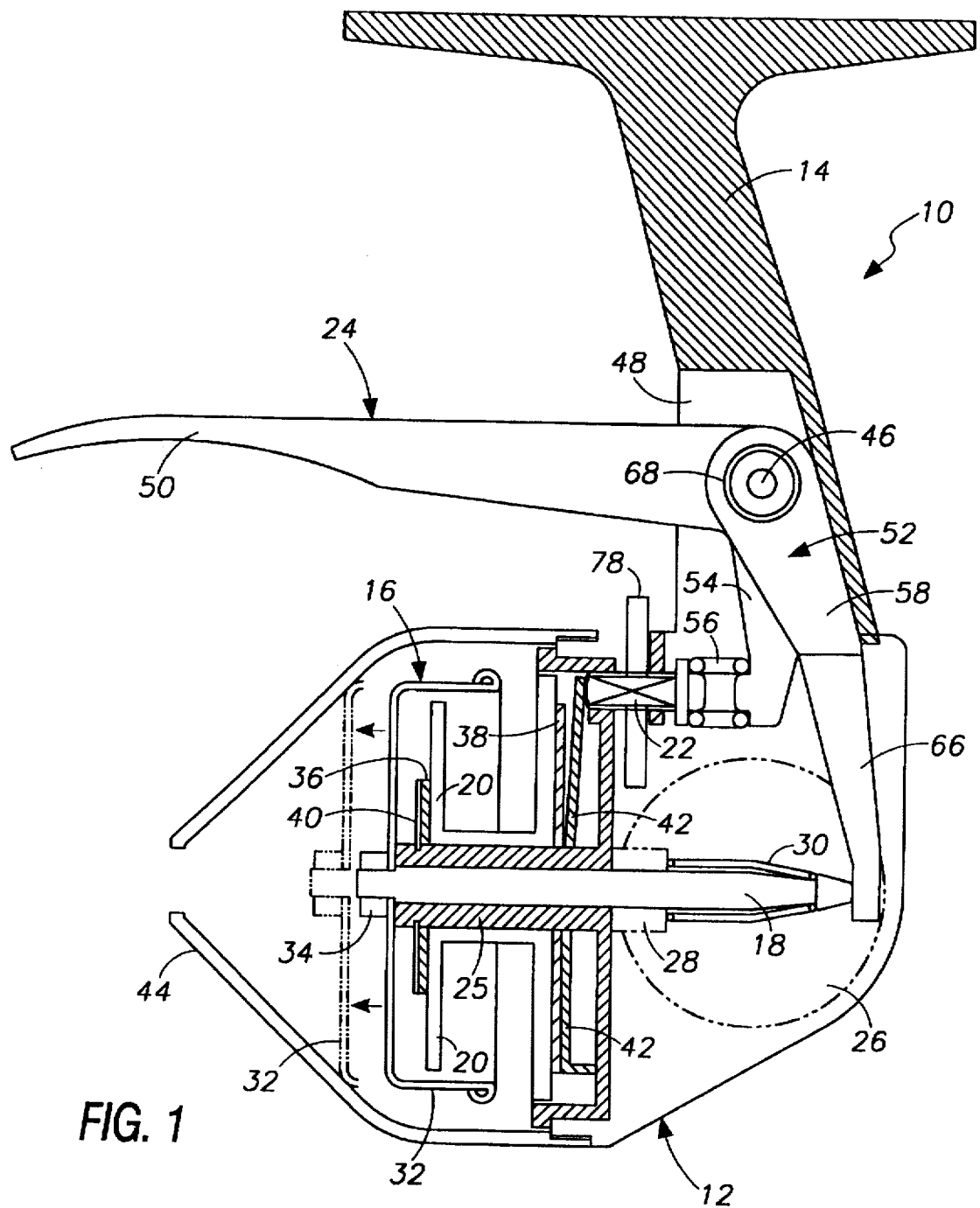
FIG. 1 is a cross sectional view of a multi-function-trigger actuated reel according to the present invention.

With reference now to the drawings, and in particular to FIGS. 1-13 thereof, a new multi-function-trigger actuated reel embodying the principles and concepts of the present invention and generally designated by the reference numeral 10 will be described.

More specifically, it will be noted that the multi-function-trigger actuated reel 10 comprises a main body 12 which can be supported relative to a fishing rod by a reel stem 14 projecting from the main body as shown in FIG. 1 of the drawings. A conventional reel mechanism 16 is mounted to the main body 12 and includes a main shaft 18 which projects through a spool 20 upon which unillustrated fishing line can be wound. The main shaft 18 forms a part of a conventionally known free spool mechanism of the reel 16 and is manipulatable so as to allow the fishing line to be freely dispensed from the spool 20 during a casting procedure or the like. The reel mechanism 16 further includes a drag plunger 22 which is a part of a drag brake mechanism of the reel 16 and is slidably mounted relative to the main body 12. The drag plunger 22 can be manipulated to effect adjustment of frictional drag against rotation of the spool 20 relative to the main body 12. A trigger assembly 24 is pivotally mounted relative to the reel stem 14 and can be manually manipulated to effect elective and individual longitudinal movement of the main shaft 18 and the drag plunger 22. By this structure, the trigger assembly 24 permits for single-handed movement of both the main shaft 18 and the drag plunger 22 to selectively effect both free-spooling of line from the reel 10 and adjustment of the drag on the spool 20, respectively.

Referring to FIG. 1 in particular, it can be shown that the main shaft 18 of the conventional reel mechanism 16 projects through a main body post 25 within the main body 12. A main gear 26 is rotatably mounted relative to the main body 12 and can be rotated through an unillustrated crank or other means connected thereto. A pinion gear 28 is slidably keyed on main shaft 18 and is held in position thereon by a free spool spring 30 interposed between the pinion gear 28 and a distal end of the main shaft 18. The main shaft 18 is movably carried in the main body post 25 and is secured to a rotor 32 by a rotor nut 34. The rotor 32 operates to wind the fishing line onto the spool 20 when the main shaft 18 is rotated through the main and pinion gears 26 and 28. The spool 20 is movably carried on the main body support post 25 and is held in position between a pair of friction washers 36 and 38 which are in turn held in place between a spool clip 40 and a drag plate 42. By this structure, the main shaft 18 can be forwardly biased so as to press the rotor 32 against a front hood 44, as shown in phantom in FIG. 1, to secure the line prior to casting. Also shown in FIG. 1, the trigger assembly 24 is pivotally supported by a support pin 46 within a cavity 48 of the reel stem 14 to permit for pivoting of the trigger assembly to selectively move the drag plunger or the main shaft in a manner which will subsequently be described in more detail.

Referring now to FIGS. 2a through 5, it can be shown that the trigger assembly 24 includes a trigger arm 50 and a selective engaging means 52 coupled to the trigger arm for selectively engaging the drag plunger 22 and the main shaft 18 in response to manual manipulation of the trigger arm relative to the reel stem 14. To this end, the trigger assembly 24 includes a drag actuator arm 54 which is fixedly secured relative to the trigger arm 50. The drag actuator arm 54 is positioned in alignment with the drag plunger 22 to effect depression of the drag plunger in response to pivoting of the trigger arm 50 in a vertical direction. A drag spring 56 can be interposed between the drag actuator arm 54 and the drag plunger 22 as shown in FIG. 1.

As shown in FIG. 2a, the selective engaging means 52 of the invention 10 includes a pair of connecting arms 58 extending along opposed sides of the trigger arm 50 and are pivotally mounted relative to the reel stem 14 by the support pin 46 which projects therethrough. FIG. 2b illustrates that the engaging means 52 can include only a single connecting arm 58 extending on a single side of the trigger arm 50. The connecting arm 58 depends from the support pin 46 and couples with an engaging plate 60. The engaging plate 60 is shaped so as to define a center recess 62 through which the drag actuator arm 54 freely projects when the trigger arm 50 is positioned in a center orientation relative to the engaging plate. A pair of flats 64 are defined along opposed sides of the center recess of the engaging plate 60 and operate to engage with a portion of the drag actuator arm 54 when the same is positioned in a laterally offset orientation relative to the engaging plate so as to cause the engaging plate to move with the drag actuator arm 54 as it is pivoted relative to the reel stem 14 during manual movement of the trigger arm 50. A free spool actuator arm 66 depends from the engaging plate 60 and is positioned for engagement with the distal end of the main shaft 18. A spring 68 is interposed between the drag actuator arm 54 and each of the connecting arms 58 or sides of the reel stem to normally bias the drag actuator arm 54 into the center orientation. This configuration allows the trigger arm 50 to be manually biased in a vertical direction only to effect movement of the drag plunger 22 to change the frictional drag on the spool 20. Alternatively, a lateral and subsequent vertical movement of the trigger arm 50 will cause a portion of the drag actuator arm 54 to engage one of the flats 64 of the engaging plate 60 to pivot the engaging plate and the attached free spool actuator arm 66 about the support pin 46. The free spool actuator arm 66 will then engage the main shaft 18 to cause free spooling of line from the spool 20.

The support pin 46 can be dimensioned so as to allow only for a sliding lateral movement of the trigger arm 50 within the cavity 48 of the reel stem 14. Alternatively, the support pin can be loosely fitted through an aperture within the trigger arm 50 such that the trigger arm is allowed to pivot relative to an axis 70 of the support pin 46, as shown in FIG. 5. The drag actuator arm 54 can thus either be pivoted or slidably positioned into engagement with one of the flats 64 of the engaging plate 60 to permit for subsequent pivoting of the free spool actuator arm 66 into engagement with the main shaft 18.

Referring now to FIGS. 6 through 9 wherein an alternative form of the selective engaging means 52 is illustrated, it can be shown that in the alternative form thereof the free spool actuator arm 66 is coupled directly to the drag actuator arm 54. A yoke 72 is coupled to a lower distal end of the free spool actuator arm 66 and includes a pair of spaced yoke arms 74 which normally reside along opposed sides of the distal end of the main shaft 18 when the trigger arm 50 is in the center orientation. As shown in FIG. 9 (a,b,c), as the trigger arm 50 is biased from the center orientation (b) and into an offset orientation (a or c), one of the yoke arms 74 of the yoke 72 will become aligned with the distal end of the main shaft 18 such that a continued vertical pivoting of the trigger arm 50 will effect movement of the main shaft 18 to cause the reel mechanism 16 to free spool.

Figure 11:
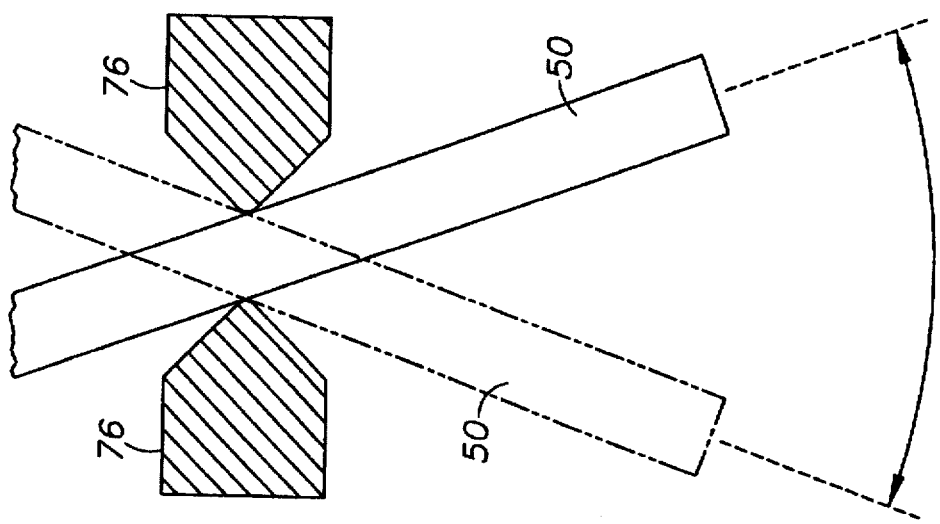
FIG. 11 is a top plan view of a portion of the alternative form of the selective engaging means illustrating an operation of the guide members.
Figure 10:
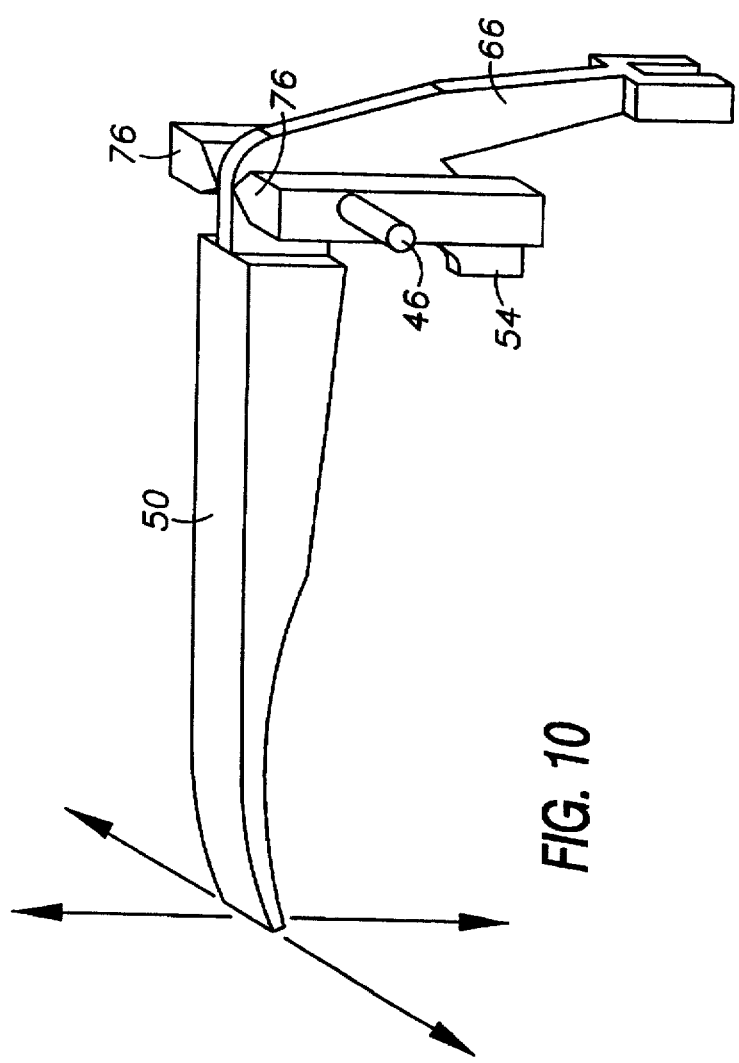
FIG. 10 is an isometric illustration of the alternative form of the selective engaging means including guide members.

As shown in FIGS. 10 and 11, the invention 10 may include guide members 76 extending along opposed sides of the trigger arm 50 wherein the guide members each taper to a pivot point or apex so as to provide vertical support to the trigger arm 50 without restricting its pivotability. As is true for all configurations, the aperture in the trigger arm 50 through which the support pin 46 projects should be large enough to permit pivoting relative to the support pin as shown in FIG. 11 and described above.

To provide for initial adjustment of the drag plunger 22 to a desired position, it is desirable for the drag plunger to be keyed against rotation and threaded along at least a portion of a length thereof. A drag dial 78 (FIG. 1) is threadably engaged with the drag plunger 22 and is abuttingly positioned against a portion of the main body 12 so as to support the drag plunger 22 in a desired initial position against the drag plate 42. This configuration permits the frictional drag on the spool 20 to be initially adjusted to a minimum amount, whereby operation of the trigger assembly 24 as described above will allow for variable adjustment of the drag above the minimum amount as desired.

In use, the trigger assembly 24 of the present invention 10 can be easily manipulated to allow for adjustment of the drag plunger 22 with the trigger arm 50. During a baitfeeding operation, the reel mechanism 16 can remain in the free spool orientation, while a live bait pulls the hook around in the water. When it is desired to quickly actuate a strong drag to set the hook in a fish, a manipulation of the trigger arm 50 in the vertical direction will bias the main shaft 18 forward to snub or pinch the fishing line between the rotor 32 and the hood 44, to easily provide a sudden and very large drag for setting the hook without having to first re-engage the reel mechanism by rotating the reel handle one turn, which is the conventional process.

Figure 12:
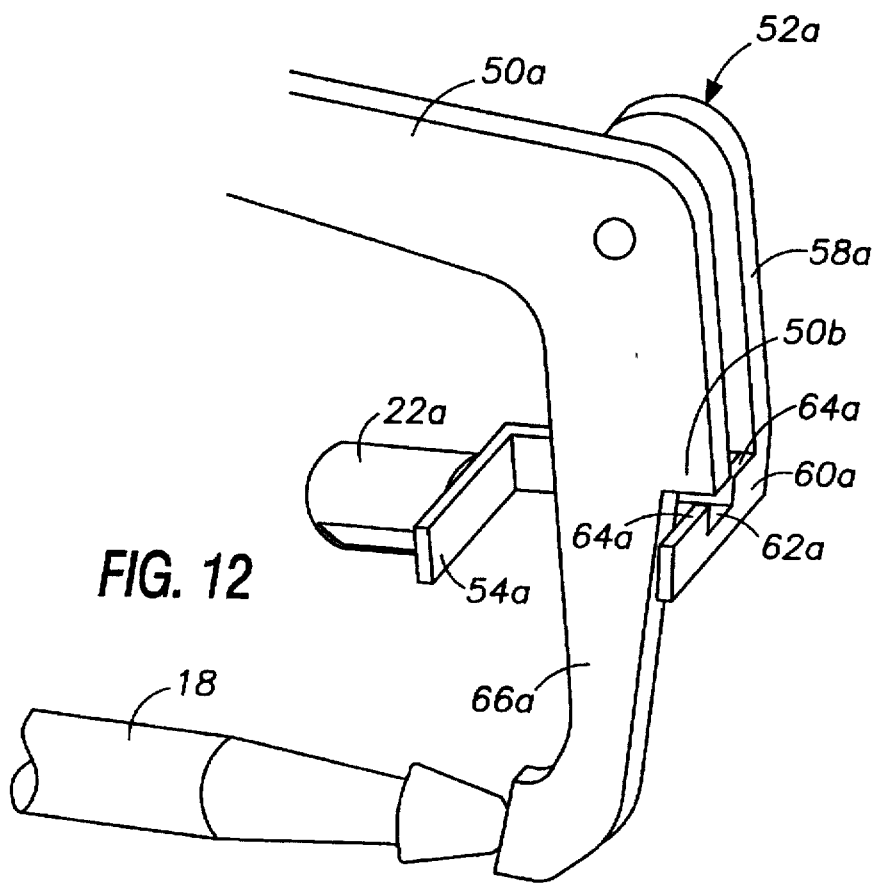
FIG. 12 is an isometric illustration of the trigger assembly showing a function reversal of FIG. 2b.
Figure 13:
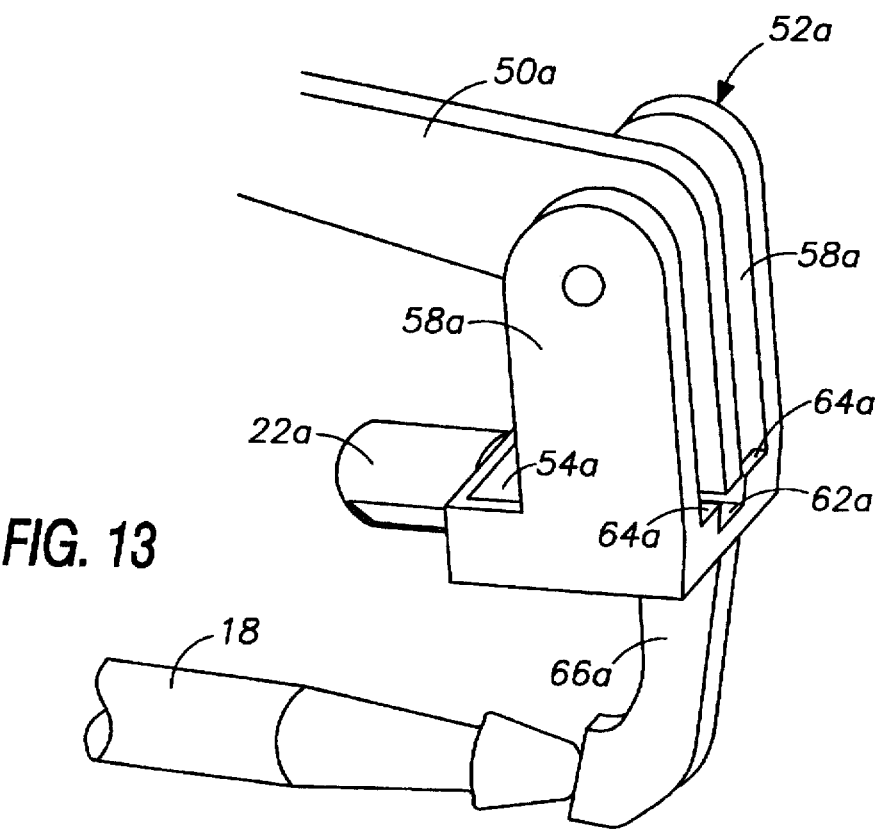
FIG. 13 is an isometric illustration of the trigger assembly showing a function reversal of FIG. 3.

The function reversal aspect of the invention is shown in FIGS. 12 and 13. In this embodiment, manipulation of the trigger arm 50a corresponds to the opposite function of the device of FIGS. 1, 2a, 2b and 3. To that end, the trigger arm 50a is coupled to the free spool actuator arm 66a and is positioned for engagement with the distal end of the main shaft 18. As shown in FIGS. 12 and 13, the selective engaging means 52a includes a connecting arm 58a extending along the side of the trigger arm 50a and coupled with an engaging plate 60a. The engaging plate 60a is shaped so as to define a center recess 62a through which the free spool actuator arm 66a freely projects when the trigger arm 50a is positioned in a center orientation relative to the engaging plate 60a. A pair of flats 64a are defined along opposed sides of the center recess 62a of the engaging plate 60a and operate to engage with a portion of the trigger arm 50b when the same is positioned in a laterally offset orientation relative to the engaging plate 60a to move the drag actuator arm 54a as it is pivoted relative to the reel stem 14 during manual movement of the trigger arm 50a.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to.

What is claimed is:

1. A multi-function-trigger actuated reel, comprising:

a main body supportable relative to a fishing rod;

a reel stem projecting from the main body;

a reel mechanism mounted to the main body and including a spool for receiving fishing line and a main shaft projecting through the spool, the main shaft being manipulatable so as to allow fishing line to be freely dispensed from the spool, the reel mechanism further including a drag plunger slidably mounted relative to the main body which is adapted to be manipulated to effect adjustment of frictional drag against rotation of the spool relative to the main body: and, a trigger assembly, wherein the trigger assembly includes a trigger arm movably mounted relative to the reel stem so as to be pivotal in a vertical direction and movable in at least one lateral direction, and, selective engaging means, wherein said selective engaging means includes a drag actuator arm secured relative to the trigger arm, the drag actuator arm being positioned in alignment with the drag plunger to effect depression of the drag plunger in response to pivoting of the trigger arm in the vertical direction, and further wherein the selective engaging means includes at least one connecting arm extending adjacent to the trigger arm and being pivotally mounted relative to the reel stem; an engaging plate secured to a lower end of the connecting arm, the engaging plate being shaped so as to define a center recess through which the drag actuator arm freely projects when the trigger arm is positioned in a center orientation relative to the engaging plate, the engaging plate being further shaped so as to define at least one flat extending alongside the center recess of the engaging plate and positioned for engagement with a portion of the drag actuator arm when the trigger arm is positioned in a laterally offset orientation relative to the engaging plate so as to cause the engaging plate to move with the drag actuator arm as the trigger arm is pivoted relative to the reel stem; and a free spool actuator arm depending from the engaging plate and positioned for engagement with a distal end of the main shaft.

2. The multi-function-trigger actuated reel of claim 1, wherein the selective engaging means further includes at least one spring interposed between the trigger arm and the reel stem to normally bias the trigger arm into the center orientation.

3. The multi-function-trigger actuated reel of claim 2, wherein the trigger arm is allowed to pivot in both the vertical direction and at least one lateral direction.

4. The multi-function-trigger actuated reel of claim 3, and further comprising a pair of guide members extending along opposed sides of the trigger arm wherein each of the guide members taper to a pivot point permitting the trigger arm to pivot in at least one lateral direction.

5. The multi-function-trigger actuated reel of claim 4, and further comprising a drag dial adjustably engaged with the drag plunger and abuttingly positioned against a portion of the main body as to support the drag plunger in a desired initial position against the drag plate.

6. A multi-function-trigger actuated reel, comprising:

a main body supportable relative to a fishing rod;

a reel stem projecting from the main body;

a reel mechanism mounted to the main body and including a spool for receiving fishing line and a main shaft projecting through the spool, the main shaft being manipulatable so as to allow fishing line to be freely dispensed from the spool, the reel mechanism further including a drag plunger slidably mounted relative to the main body which is adapted to be manipulated to effect adjustment of frictional drag against rotation of the spool relative to the main body; and, a trigger assembly, wherein the trigger assembly includes a trigger arm movably mounted relative to the reel stem so as to be pivotal in a vertical direction and movable in at least one lateral direction, and, selective engaging means, wherein said selective engaging means includes; and, selective engaging means, wherein said selective engaging means includes a drag actuator arm secured relative to the trigger arm, the drag actuator arm being positioned in alignment with the drag plunger to effect depression of the drag plunger in response to pivoting of the trigger arm in the vertical direction, and further wherein the selective engaging means includes a free spool actuator arm coupled relative to the drag actuator arm; and a yoke coupled to a lower distal end of the free spool actuator arm and including a pair of spaced yoke arms which normally reside along opposed sides of the distal end of the main shaft when the trigger arm is in a center orientation, with a biasing of the trigger arm from the center orientation and into an offset orientation effecting alignment of one of the yoke arms of the yoke with a distal end of the main shaft such that a subsequent vertical pivoting of the trigger arm will effect movement of the main shaft.

7. The multi-function-trigger actuated reel of claim 6, wherein the selective engaging means further includes at least one spring interposed between the trigger arm and the reel stem to normally bias the trigger arm into the center orientation.

8. The multi-function-trigger actuated reel of claim 7, wherein the trigger arm is allowed to pivot in both the vertical direction and at least one lateral direction.

9. The multi-function-trigger actuated reel of claim 8, and further comprising a pair of guide members extending along opposed sides of the trigger arm wherein each of the guide members taper to a pivot point permitting the trigger arm to pivot in at least one lateral direction.

10. The multi-function-trigger actuated reel of claim 9, and further comprising a drag dial adjustably engaged with the drag plunger and abuttingly positioned against a portion of the main body as to support the drag plunger in a desired initial position against the drag plate.

11. A multi-function-trigger actuated reel comprising:

a main body supportable relative to a fishing rod;

a reel stem projecting from the main body;

a reel mechanism mounted to the main body and including a spool for receiving fishing line and a main shaft projecting through the spool, the main shaft being manipulatable so as to allow fishing line to be freely dispensed from the spool, the reel mechanism further including a drag plunger slidably mounted relative to the main body which is adapted to be manipulated to effect adjustment of frictional drag against rotation of the spool relative to the main body;

a trigger arm movably mounted relative to said reel stem; wherein said trigger arm is positionable in a first orientation and a second orientation;

selective engaging means coupled to said trigger arm;

wherein said selective engaging means selectively engages said drag plunger when said trigger arm is positioned in said first orientation and in response to manual manipulation of said trigger arm, and wherein said selective engaging means selectively engages said main shaft when said trigger arm is positioned in said second orientation and in response to manual manipulation of said trigger arm.

12. The multi-function-trigger actuated reel of claim 11, wherein the trigger arm is movably mounted relative to the reel stem so as to be pivotal in a vertical direction and movable in at least one lateral direction.

13. The multi-function-trigger actuated reel of claim 12, wherein pivoting of the trigger arm in a vertical direction will only move the drag plunger, and further wherein initial movement of the trigger arm in the lateral direction followed by pivoting of the trigger arm in a vertical direction will move the main shaft.

14. The multi-function-trigger actuated reel of claim 12, wherein pivoting of the trigger arm in a vertical direction will only move the main shaft, and further wherein initial movement of the trigger arm in the lateral direction followed by pivoting of the trigger arm in a vertical direction will move the drag plunger.

15. The multi-function-trigger actuated reel of claim 14, further including a free spool actuator arm secured relative to the trigger arm, the free spool actuator arm positioned for engagement with a distal end of the main shaft, and further wherein the selective engaging means includes at least one connecting arm extending adjacent to the trigger arm and being pivotally mounted relative to reel stem; an engaging plate secured to the lower end of the connecting arm, the engaging plate being shaped so as to define a center recess through which the free spool actuator arm freely projects when the trigger arm is positioned in the center orientation relative to the engaging plate, the engaging plate being further shaped so as to define at least one flat extending alongside the center recess of the engaging plate and positioned for engagement with a portion of the free spool actuator arm when the trigger arm is positioned in a laterally offset orientation relative to the engaging plate so as to cause the engaging plate to move with the free spool actuator arm as the trigger arm is pivoted relative to the reel stem; and a drag actuator arm depending from the engaging plate and positioned in alignment with the drag plunger to effect depression of the drag plunger.

16. The multi-function-trigger actuated reel of claim 14, further including a free spool actuator arm secured relative to the trigger arm, the free spool actuator arm being positioned for engagement with a distal end of the main shaft in response to pivoting the trigger arm in the vertical direction, and further wherein the selective engaging means includes a drag actuator arm coupled relative to the free spool actuator arm; and a yoke coupled to a lower distal end of the drag actuator arm and including a pair of spaced yoke arms which normally reside along opposed sides of the distal end of the drag plunger when the trigger arm is in a center orientation, with a biasing of the trigger arm for the center orientation and into an offset orientation effecting alignment of one of the yoke arms of the yoke with the distal end of the drag plunger such that a subsequent vertical pivoting of the trigger arm will effect movement of the drag plunger.

17. A multi-function-trigger actuated reel comprising:

a main body supportable relative to a fishing rod;

a reel stem projecting from the main body;

a reel mechanism mounted to the main body and including a spool for receiving fishing line;

a trigger arm movably mounted relative to said reel stem; wherein said trigger arm is positionable in a first orientation and a second orientation;

selective engaging means coupled to said trigger arm; wherein said selective engaging means selectively effects a first actuation of the reel mechanism when said trigger arm is positioned in said first orientation and in response to manual manipulation of said trigger arm, and wherein said selective engaging means selectively effects a second actuation of the reel mechanism when said trigger arm is positioned in said second orientation and in response to manual manipulation of said trigger arm.

18. The multi-function-trigger actuated reel of claim 17, wherein the trigger arm is movably mounted relative to the reel stem so as to be pivotal in a vertical direction and movable in at least one lateral direction.

19. The multi-function-trigger actuated reel of claim 18, wherein pivoting of the trigger arm in a vertical direction only will actuate the first actuation of the reel mechanism, and further wherein initial movement of the trigger arm in the lateral direction followed by pivoting of the trigger arm in a vertical direction will actuate the second actuation of the reel mechanism.

* * * * *

UNITED STATES PATENT AND TRADEMARK OFFICE
CERTIFICATE OF CORRECTION

PATENT NO.  : 5,697,566
DATED       : December 16, 1997
INVENTOR(S) : John Newton Young It is certified that error appears in the above-indentified patent and that said Letters Patent is hereby corrected as shown below:

At column 7, lines 27-28, delete "wherein said selective engaging means includes; and selective engaging means,".

Signed and Sealed this

Thirtieth Day of June, 1998

Attest:

BRUCE LEHMAN

Attesting Officer

Commissioner of Patents and Trademarks